United States Patent [19]
Nemeth

[11] 4,106,583
[45] Aug. 15, 1978

[54] SELF-POWERED FOLDING GOLF CART

[75] Inventor: Edwin A. Nemeth, Martinez, Calif.

[73] Assignee: P. N. Associates, Inc., Walnut Creek, Calif.

[21] Appl. No.: 717,780

[22] Filed: Aug. 25, 1976

[51] Int. Cl.² ............................................. B62D 51/04
[52] U.S. Cl. .................................. 180/65 E; 180/6.5; 180/65 R; 280/DIG. 5
[58] Field of Search ............... 180/65 R, 65 E, 65 F, 180/6.5; 64/30 E

[56] References Cited
U.S. PATENT DOCUMENTS

| | | | |
|---|---|---|---|
| 3,691,791 | 9/1972 | Yoshii | 64/30 E |
| 3,818,292 | 6/1974 | Berman | 180/65 R |
| 3,820,617 | 6/1974 | Groff | 180/65 F |
| 3,901,337 | 8/1975 | Cragg | 180/65 F |

*Primary Examiner*—Joseph F. Peters, Jr.
*Assistant Examiner*—Donn McGiehan
*Attorney, Agent, or Firm*—Townsend and Townsend

[57] ABSTRACT

A power-assisted manually operated golf bag carrying cart is disclosed. The cart features a foldable tricycle support frame having parallel drive wheels, which can be maintained in parallel over a range of adjustment, and independently-powered direct drive d.c. motors coupled to shock isolated wheels. A control scheme is described wherein a hand grip with a mechanically isolated continuously variable throttle provides control signals to a power-control circuit providing independent direct drive to each of the drive wheels. Power supplied by variable pulse width pulse train developing intermittent high peak torque yet low average torque in the normal duty cycle range drives the d.c. motors. The motor drive scheme provides an electrical limited slip differential which permits easy turning without undesirable power dissipation.

7 Claims, 12 Drawing Figures

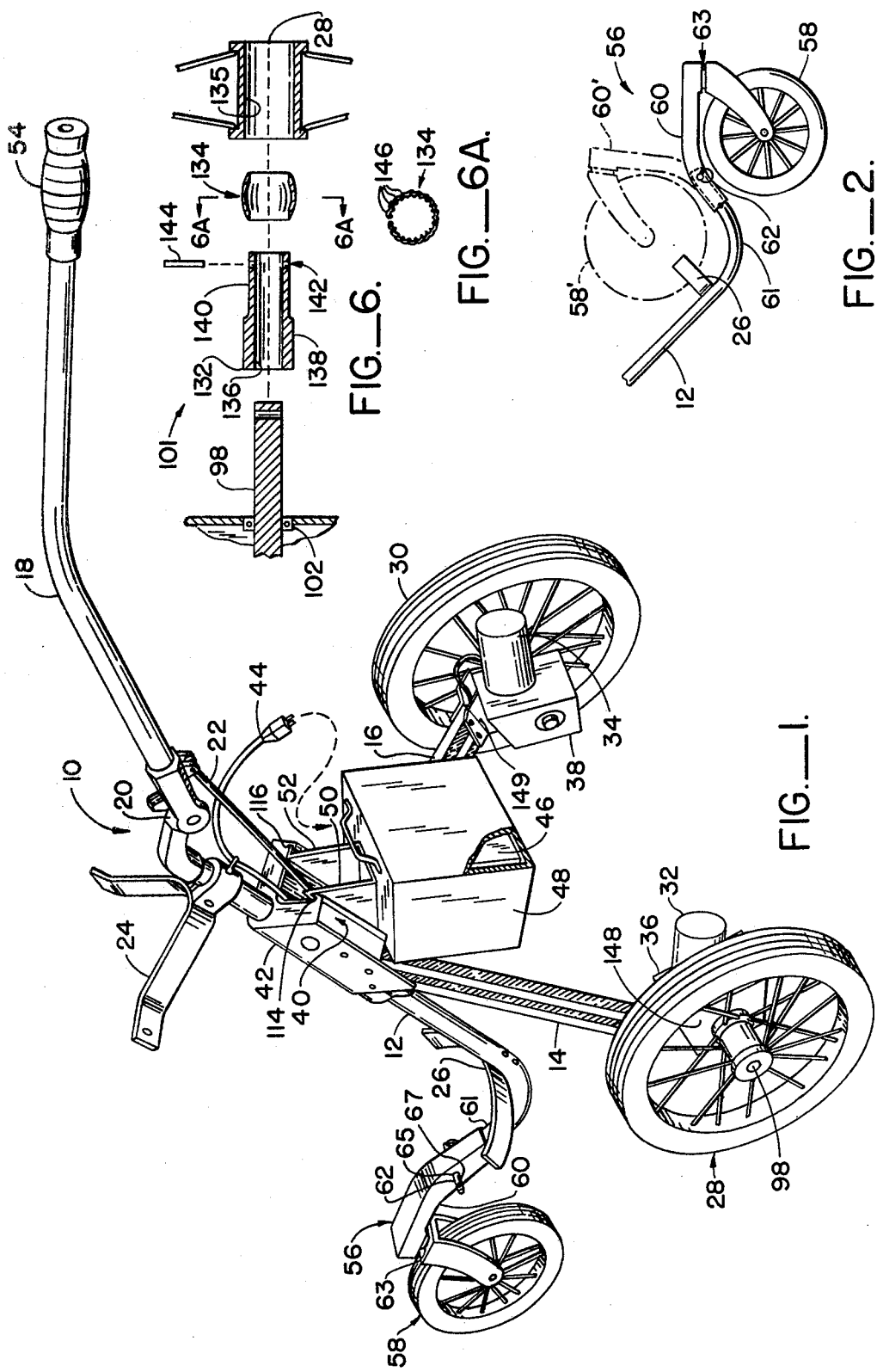

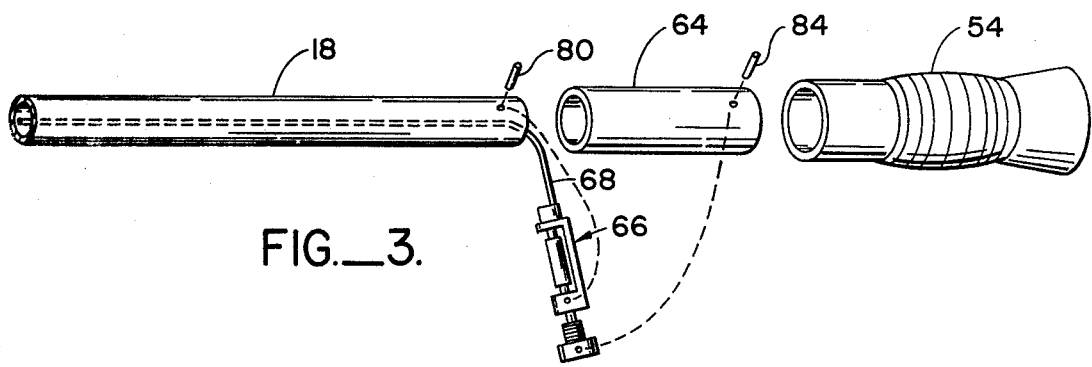
FIG._3.
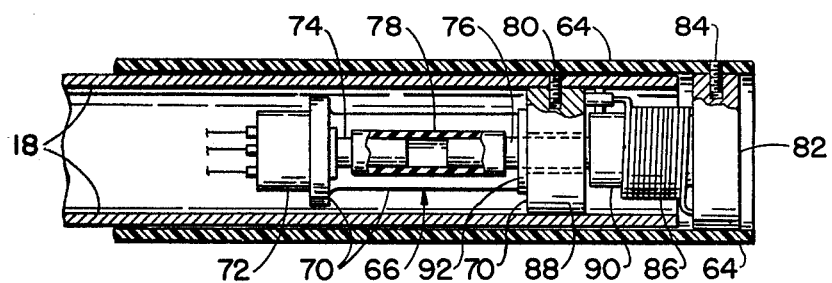
FIG._4.
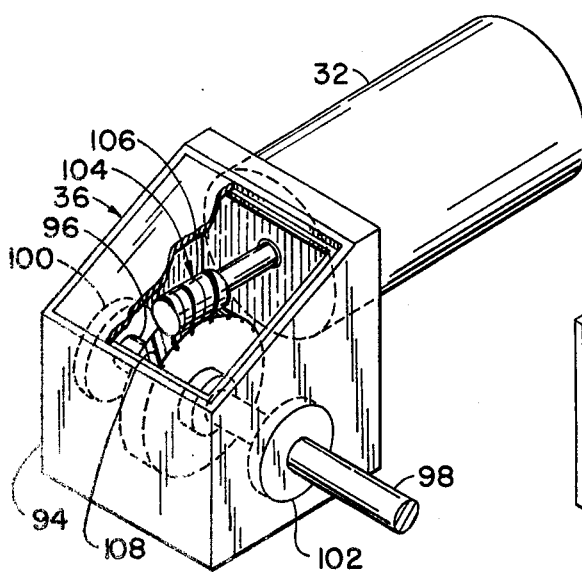
FIG._5.
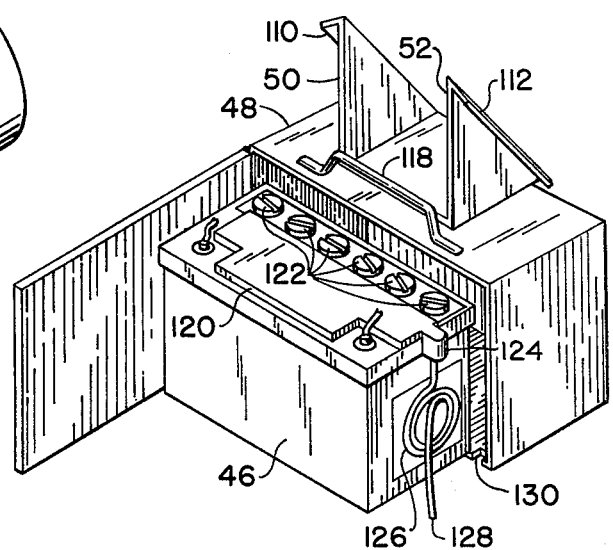
FIG._7.

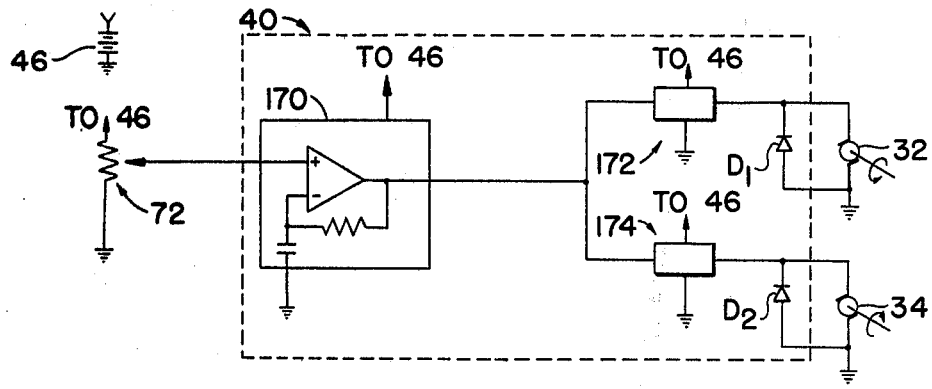
FIG._9.
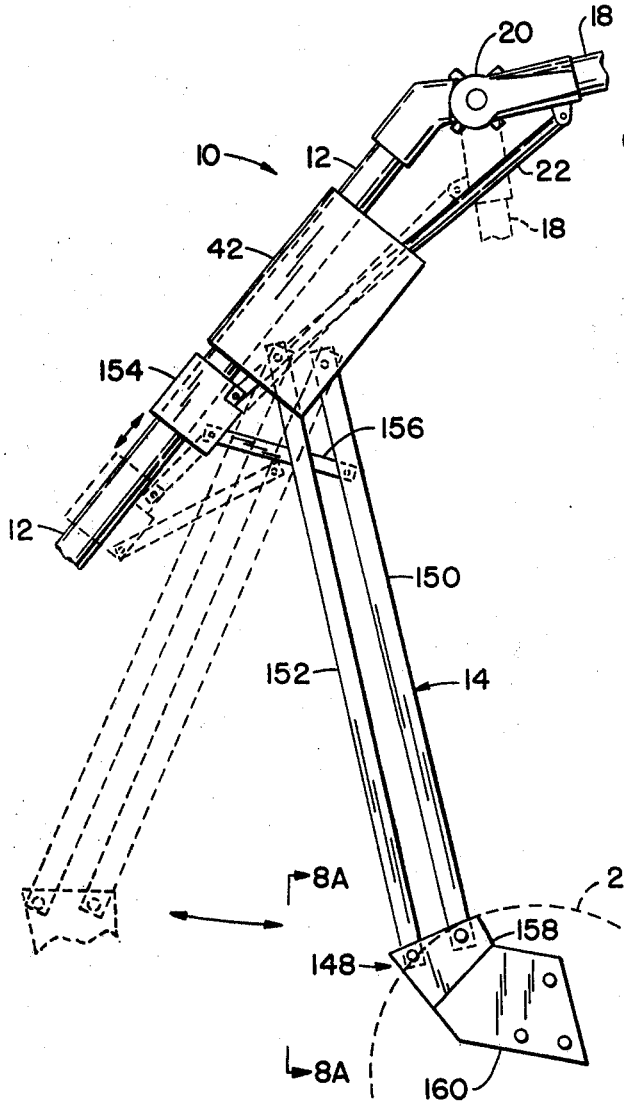
FIG._8.
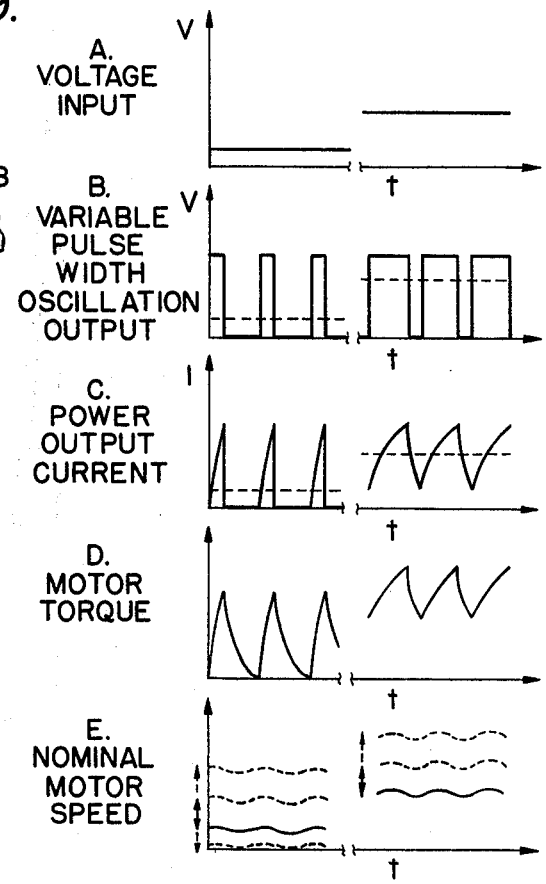
A. VOLTAGE INPUT
B. VARIABLE PULSE WIDTH OSCILLATION OUTPUT
C. POWER OUTPUT CURRENT
D. MOTOR TORQUE
E. NOMINAL MOTOR SPEED
FIG._10.
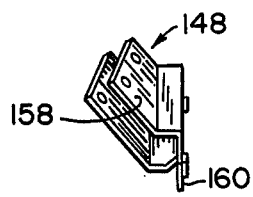
FIG._8A.

SELF-POWERED FOLDING GOLF CART

BACKGROUND OF THE INVENTION

1. Field of the Invention

This invention is related to self-powered electric carts and in particular to an electrically powered push-type collapsible tricycle cart having dual independent motor drive.

Electrically powered vehicles are quite popular on golf courses. However, vehicles large enough for transporting passengers are generally expensive and therefore beyond the means of the average golfer to purchase or to transport to and from the golf course. On the other hand, light pull- or push-type golf carts are known for caddying golf bags alone. Such non-powered carts are quite popular, especially if collapsible. However, a non-powered cart becomes a major burden to drag or push around the golf course.

As a compromise, powered golf bag carrying carts have ben proposed. However, such powered carts have not met with success for various reasons. A number of such problems, prior proposed solutions and shortcomings of these solutions are illustrated by the prior art.

2. Description of the Prior Art

One example of a powered golf club carrying cart is described in U.S. Pat. No. 3,704,758 to Cropp, wherein a pair of d.c. motors is series connected to a large bank of rather heavy multi-celled batteries. Such a device is costly, excessively heavy, bulky, unsightly and not easily stored or transported and therefore not readily accepted by the average golfer. A relatively light, collapsible golf cart is therefore needed.

One proposed collapsible golf cart is described in U.S. Pat. No. 3,867,993 to Iizuka. The Iizuka patent describes a particular mechanism rendering a powered two-wheel cart collapsible. It has been found, however, that certain mechanisms of the Iizuka cart are subject to failure and frequent breakdown. For example, the legs of the Iizuka cart are subject to buckling and warping, and an internal main column slide bracket for supporting the legs is subject to jamming or sticking.

Two-wheeled carts are often found to be unsuited to power drive. Such carts with the power source (the battery) located along the main column may be easily upset if tipped too far. Prior three-wheeled arrangements, such as suggested in the Cropp patent may provide stability, but known arrangements are not suited to collapsible carts, where compact storability is a prerequisite.

It is often desirable to change the configuration of the collapsible carts slightly to accommodate the tastes of the operator or the terrain. For example, the operator may wish to raise or lower the steering arm, or it may be necessary to narrow the wheel base of the cart in order to negotiate a narrow path. It is thus desirable to include provision for adjusting steering arm height and for changing the drive wheel base without jeopardizing the performance of the cart. This might be done, for example, by assuring that the drive wheels remain parallel and vertical to the ground in cart configurations intermediate between fully collapsed and fully extended.

Providing continuously variable power to the drive motors presents special problems. Conventional d.c. power varying schemes such as bleeding excess drive current into a load resistance is wasteful of precious battery power. Alternating current control schemes are impractical in golf carts, since a.c. power is not readily available within practical weight and space constraints imposed by the need to provide a portable power source. In particular, known throttle transducer schemes, as suggested in the Cropp patent, or by Voight in U.S. Pat. No. 2,706,008, generally provide only discrete voltage levels of power through a tap changing switch.

A motorcycle type continuously variable throttle which might be located within a handle of a golf cart is subject to peculiar strains and shocks, particularly where the handle is also used to guide and control the golf cart. These factors must be taken into account in the embodiment of a practical throttle transducer.

The battery power sources for golf carts contain corrosive battery acid which, if accidently leaked or spilled, can cause considerable damage. Yet, practical batteries must be vented in order to prevent the equally dangerous build up of gases. Golf cart power packs also can be accidently tipped during transportation or storage. Thus, there exists a need to provide a vented battery which includes means for containing battery acid against spillage as might be caused by accidental tipping.

A major problem associated with powered golf carts is related to the differential action of the wheels and protection of the motors against shock caused by irregular terrain. Several solutions are known. One is described in U.S. Pat. No. 3,893,532 to Perlowin. Therein a belt drive is provided as a safeguard against terrain-caused shocks against the wheels which might damage the motor or the gearing.

Direct drive of the wheels is preferred, since energy transfer is much more efficient. Known direct drive schemes, however, suffer from the dual disadvantages of poor shock isolation and difficulties in turning. A powered golf cart can be turned in two modes. In one known direct drive scheme, one of the drive wheels may be speeded up relative to the nominal speed. This is suggested in the cart described in the Iizuka patent supra. Therein the cart includes individual wheel motors equipped with one-way clutches (the motors being coupled in parallel) which permits the wheels to travel at differing speeds while negotiating turns. This scheme has a number of disadvantages. First, the wheel on the inner turning radius will continue to rotate at the pre-turn speed. As a result the wheel on the outer turning radius must be accelerated to a velocity allowing the vehicle to turn. Second, in downhill travel, the wheels turn freely, since the motors provide no inertial resistance. As a consequence, the operator must provide all restraining forces on the massive load of cart, clubs and battery. And finally, the clutches employed therein are notoriously fragile and are prone to breakdown under terrain-induced shock.

In a further known direct drive scheme one of the wheels may be slowed down. A cart with two d.c. electric motors coupled to parallel and provided with a constant voltage tends to move in a straight line. An attempted turn causes substantial loading on one or other of the motors. The slower, more heavily loaded motor develops substantially higher torque than the faster motor and draws considerably higher current, resisting any attempt to turn the cart.

Series-connected d.c. motors, on the other hand, tend to transfer maximum drive power to the motor under the least load. As a result, turning is relatively easy. However, there are a number of drawbacks. For example, unequal loading between the wheels, as might be caused by misalignment of the wheels, travel along a hillside or travel over wet, loose or rocky terrain, causes power to be shifted to the least loaded motor. This may pull the cart to one side or cause wheels to spin earatically.

Thus, if the advantages of direct drive are to be obtained, then the differential problem and the shock isolation problem must be overcome.

SUMMARY OF THE INVENTION

A power assisted manually operated golf bag carrying cart features a foldable tricycle support frame having parallel drive wheels which can be maintained in parallel over the full range of adjustment, and independently powered direct drive d.c. motors coupled to shock isolated wheels. A control scheme includes a single handle with a mechanically isolated, continuously variable throttle and a power control circuit providing independent direct drive to each of the drive motors. The power control circuit drives the motors by providing a variable pulse width pulse train developing intermittent high peak torque, yet low average torque in the normal duty cycle range.

The motor drive scheme according to the invention provides an electrical limited slip differential which permits relatively easy turning without undesirable power transfer between wheels or wasteful power dissipation.

The invention also includes a battery acid trap to inhibit escape of acid from a vented battery, particularly if accidently tipped.

A golf cart according to the invention incorporates a variety of advantages over the prior art, some of which are here listed. First, a cart as herein described is sufficiently powerful and sturdy enought to carry a load of golf clubs through the rugged terrain of a golf course. Second, the cart is relatively lightweight and energy efficient, so that it is easily handled and has a long service range. Third, the cart is easily adjusted to the preference of the user and can easily be stored in a collapsed compact position, for example in the trunk of a car. Fourth, the pivoting tricycle configuration removes any load carrying requirement from the operator, yet allows instant turning. Fifth, the differential scheme of the cart permits easy turning and prevents stalling in rough or uneven terrain. And sixth, the drive gearing and motors are protected against the danger of wheel shock damage through shock isolation between the wheels and the gearing.

Further advantages in the particular features of the invention are best understood by reference to the following detailed description and the accompanying drawings.

BRIEF DESCRIPTION OF THE DRAWINGS

FIG. 1 is a perspective view of a foldable golf club carrying cart according to the present invention;

FIG. 2 is a side view of third wheel castor assembly;

FIG. 3 is an exploded perspective view of a throttle assembly according to the invention;

FIG. 4 is a side view in partial cutaway of the throttle mechanism of FIG. 3;

FIG. 5 is a perspective view in partial cutaway of a motor and drive assembly according to the invention;

FIG. 6 is a side cross sectional view of a drive wheel coupling according to the invention;

FIG. 6A is a front cross sectional view of a steel band in FIG. 6;

FIG. 7 is a perspective view of a power pack for the golf cart, with a vented battery having an acid trap;

FIG. 8 is a side elevational view of a collapsible strut of the cart of FIG. 1;

FIG. 8A is a front elevational view of a leg bracket of FIG. 8;

FIG. 9 is a block diagram of a circuit for controlling the electric drive motors; and FIG. 10 depicts waveform diagrams useful for understanding motor operation.

DETAILED DESCRIPTION OF PREFERRED EMBODIMENTS

FIG. 1 illustrates a golf club carrying tricycle cart 10 having a frame main column 12, legs 14 and 16 pivotally linked to the main column 12, and guiding arm 18 coupled to the main column 12 through an adjustable pivot 20 and supporting link 22. Golf bag supports 24 and 26 are provided on the main column 12 to support a golf bag (not shown) in an inclined position.

A pair of drive wheels 28 and 30 are each individually provided with electric motors 32 and 34, and drive trains 36 and 38, mounted at the end of each of the legs 14 and 16. The electric motors 32 and 34 are coupled to a power control circuit 40 which is mounted on the main column 12 within an enclosure 42. Power is provided through a cable 44, coupled to a power source, such as a d.c. battery 46, within a housing 48 detachably hung to the main column 12, on a pair of vertically disposed triangular struts 50 and 52 which retain the housing 48 in a relatively level position.

At the end of the guiding arm 18, a hand grip 54 is provided. The hand grip 54 serves both as a steering level guiding the cart 10 and as a throttle for the motors 32 and 34.

Tricycle wheel assembly 56, including a pivotable caster wheel 58 rotatably coupled to a curved arm 60, is telescopically attached to the main column 12 and secured by a cotter pin 62. Referring to FIG. 2, it is seen that the lower portion of the main column 12 defines an upwardly arching segment 61 adjacent the end below the strut 26. The arm 60 is adapted to fit over the end of the main column 12 and to be secured in a first down position by the cotter pin 62 and in a second up position, as shown in phantom. In the down position, a pivot 63 through the arm 60 supporting the caster wheel 58 is approximately vertical with the ground. The wheel 58 is free to pivot to any orientation. In the second up position the axis of pivot is generally horizontal so that the caster wheel 58 hangs by its own weight. In the up position, the wheel 58 (in phantom) is in a compact upwardly and inwardly projecting suspended position approximately conforming to the upwardly arching elbow formed by main column segment 61 and the arm 60 (in phantom). Moreover, the hanging wheel 58 (in phantom) with the cart upright is protected by the strut 26.

The cotter pin 62 (FIG. 1) is readily though forcibly insertable into and removeable from keyway 65 through curved arm 60 and curved segment 61. The cotter pin 62 is a straight rod with a collapsible stop button 67 at the insertable end and a suitable stop such as a ring 69 at the opposite end.

FIG. 3 and FIG. 4 show a detail of the throttle on the guiding arm 18. The hand grip 54 is snugly attached to a hollow tube 64 which telescopically fits over the end of the hollow guiding arm 18. The tube 64 may be a suitable non-binding material, such as nylon. The inside of the tube 64 and the outside of the arm 18 act as a journal bearing permitting free axial rotation of the hand grip 54 relative to the arm 18.

Transducer 66 is provided which fits partially within the hollow end of the arm 18 and within the hollow tube 64. The transducer 66, which is for converting an angular position to an electrical signal, is coupled to the control circuitry (not shown) by a cable 68 through the center of the arm 18.

Referring particularly to FIG. 4, the transducer 66 comprises a generally axial frame member 70 to which is rigidly mounted a potentiometer 72 at one end facing a rotatable throttle shaft 76 mounted at the other end. The potentiometer 72 has a control shaft 74 extending approximately parallel to the axis of the frame member 70 toward an opposed end of the throttle shaft 76. A flexible coupling 78 links the control shaft 74 and the throttle shaft 76. The coupling 78 may be a short piece of elastic tubing such as surgical rubber tubing fixedly attached over each end of the respective shafts 74 and 76. The frame assembly 70 is locked to arm 18 by a set screw 80. The throttle shaft 76 is fastened to a circular cap 82 outside the end of arm 18 which is linked by a set screw 84 to the hollow tube 64 circumscribing arm 18. Thus, the hand grip 54 is rigidly attached to the throttle shaft 76 which is rotatable with respect to the frame member 70, the frame member 70 being fixedly attached to the arm 18. Biasing means, such as a coil spring 86 may be provided between the rotatable portion and the fixed portion 76 and thereby the control shaft 74 to maintain the throttle shaft in a desired rest position.

Constructed as herein described the electrical portion namely the potentiometer, is mechanically isolated from the mechanical portions, including the throttle shaft 76 and hand grip, which are subject to substantial axial loading during use which would otherwise damage the potentiometer 72, since the hand grip 54 is used to guide as the cart 10 is pushed, pulled or turned. Moreover, the elasticity of the flexible coupling 78, readily maintains the potentiometer shaft in a fully off rest position and compensates for any misalignment between the shaft of the potentiometer 74 and the throttle shaft 76.

The throttle hand grip 54 is the principal manual control mechanism for the cart 10. (Two-state type controls such as a forward, reverse switch — not shown — braking mode control switch — not shown — may be separately mounted on the guiding arm 18.) To move the cart 10 straight ahead, the operator merely twists the hand grip 54, which activates the throttle 66. The circular cap 82 rotates the throttle shaft 76 and coupling 78, which in turn rotates the control shaft 74 of potentiometer 72. The resultant change of electrical resistance is communicated as an electrical signal via cable 68 to the motor power control circuit 40 (FIG. 1.) The motors are each independently activated to pull the cart forward as hereinafter explained. The side wheels 28 and 30, if equally loaded, direct the cart 10 substantially straight ahead. To turn the cart, the operator may press the hand grip 54 and thereby the guiding arm 18 to the right or the left, either pushing one wheel slightly faster motor speed and the speed of the other wheel, or slowing one wheel and motor to permit the other motor and wheel to pull the cart 10 in the desired turning arc.

The frame member 70 must be a relatively sturdy construction. For example, the frame member 70 may include a block 88 snugly engaging the inner wall of the arm 18 and supporting the set screw 80. The throttle shaft 76 may be held against axial displacement with respect to the block 88 by a cylinder 90 attached to shaft 76 on one side of the block 88 and by locking ring 92 attached to the shaft 76 on the opposite side of the block 88. A thrust bearing between block 88 and lock ring 92 allows free rotation of the mechanism even under heavy axial loads.

Referring now to FIG. 5, one of the motors and drive trains is illustrated, namely the left side motor 32 and drive train 36, the right side motor 34 and drive train 38 being mirror images thereof. The drive train 36 includes a casing 94 and a drive shaft 96 intergrally formed with a wheel supporting axle 98 and mounted on bearings 100 and 102 in the casing 94. The drive train comprises a worm gear 104 including a shaft 106 extending from the rotor (not shown) of the motor 34 and coupled at right angles to a wheel gear 108 which is mounted to the drive shaft 96.

The drive train 36 and 38 provide direct drive between the individual motors 32 and 34 and the axles 98.

FIG. 6 illustrates a coupling 101 between the axle 98 and the wheel 28. As shown, a wheel bushing 132 and a flexible corrugated steel band 134 are interposed between the axle 98 and a hollow axial tube 135 of wheel 28. The wheel bushing 132 comprises a cylinder having an inner diameter 135 conforming to the outer diameter of the axle 98 and a maximum outer diameter on one segment 138 conforming to the inner diameter of the wheel tube 135. A narrower diameter segment 140 is provided adjacent the normally outboard end of the bushing 132. The bushing 132 is also provided with a keyway 142 which accommodates a cotter key or pin 144.

The corrugated steel band 134 comprises a thin sheet of spring steel shim or the like provided with axially aligned corrugations 146. This construction is illustrated in a cross section of the band 134 in FIG. 6A.

The wheel to axle coupling 101 is assembled as follows. The band 134, formed into a ring, is fitted over the bushing 132 on segment 140. The wheel 28 is pressed onto the bushing 132 and held in place under frictional compression by the steel band 134. The wheel 28 bushing 132 and steel band 134 are then mounted to the axle 98 and fastened with pin 144.

The band 134 secures the wheel 28 against undesired rotational slippage. Under normal loads no slippage is permitted. However, should the wheel 28 encounter rocks or other large objects, the band 134 permits limited slippage of the wheel 28 relative to the axle 98, thereby at least partially isolating the gears of the drive train 36 from damaging shocks which might otherwise disable the cart 10. The cart 10 therefore benefits from the efficiency of essentially direct drive; yet is is protected against shock damage which might otherwise result from normal use. As a result, direct drive, smaller and lighter motors and drive trains can be used, reducing power consumption and extending the useful range of the cart. Moreover, need for frequent repair or replacement of drive parts is substantially reduced.

FIG. 7 illustrates the d.c. power supply, including battery 46 and housing 48 for the cart 10. The housing 48 includes vertically disposed triangular struts 50 and 52 having rails 110 and 112 along the top margin which are adapted to fit in tracks 114 and 116 (FIG. 1) mounted to the main column 12 of the cart 10. The battery housing 48 is suspended from a stabilizing location, e.g., the center of gravity of the cart 10. A handle 118 on the top of the housing 48 is provided to facilitate handling and carrying.

The d.c. battery 46 is generally a lead acid-type vented battery capable of deep discharge and recharge. Sealed batteries are found to be unsatisfactory in the present application, since the known sealed batteries are unsuited to applications subject to deep discharge before recharge. Large quantities of gases are typically liberated during recharge, so means must be provided for releasing the fumes.

With reference to FIG. 7 the battery 46 is seen to include a manifold 120 sealably covering access vents (not shown) in the top of the battery. The manifold 120 comprises a generally flat thin hollow chamber which sealably covers the top of the battery 46. Sealed battery caps 122 are provided through the manifold covering holes through which the battery acid may be replenished. The top of each cap 122 is sloted to accommodate a screwdriver for tightening and loosening the caps 122 which are thread mounted through the manifold 120.

At one side of the manifold 120 adjacent the battery side, a manifold fluid outlet 124 is provided. Sealably coupled to the fluid outlet 124 is an open tube 126. The tube 126 is wound in a coil and placed on the side of the battery 46 with its open end 128 directed downwardly. The battery 46 is placed in the battery housing 48. A slot 130 is provided in the bottom of the housing 48 to accommodate the open end 128.

If the battery 46 in its housing 48 is inadvertently tipped, the sealed manifold 120 in combination with the coiled tube 126 inhibits the undesired escape of battery acid from the battery 46, which would otherwise occur. Where the battery is temporarily stored or transported, for example in the trunk of a car, the coiled tube prevents spillage of battery acid electrolyte which might cause serious damage.

FIG. 8 illustrates features which render the cart 10 collapsible. Enclosure 42 attached to main column 12 couples the leg 14 to a wheel bracket 148 supporting the drive wheel 28. Leg 14 includes a first leg strut 150 and second leg strut 152 each pivotally coupled at their ends to enclosure 42 and bracket 148. The axes of pivot for each of these linkages is perpendicular to a plane which is parallel to the main column 12. Such a plane though not specifically depicted, may best be visualized with reference to FIG. 1. The leg 14 and main column 12 would lie in one such plane, while the leg 16 and main column 12 would lie in the other such plane.

Referring again to FIG. 8, a slidable collar 154 is attached to the main column 12 below enclosure 42. A link arm 156 is rotationally coupled between the collar 154 and the first strut 150. Supporting link 22 is rotationally coupled to the guiding arm 18 at a position spaced from the adjustable pivot 20 at one end, and at its opposite end, link 22 is coupled to collar 154.

A front view of bracket 148 is shown in FIG. 8A. Bracket 148 comprises a first plate segment 158 joining the leg 14 and a second plate segment 160 for mounting the wheel 28. The leg joining plate segment 158 is seen to form an oblique angle to the wheel mounting segment 100. This permits the wheel 28 to be maintained parallel to wheel 30 (which is attached to a like support bracket 149), and accommodates the struts 150 and 152 in the plane through the main column 12.

To change the cart 10 from an open position (shown in solid lines) to a collapsed position (shown generally in phantom lines), the adjustable pivot 20 is loosened, and the guiding arm 18 is bent downwardly to cause supporting link 22 to advance collar 152 down main column 12. Collar 154 draws the first strut 150 by means of arm 156 toward main column 12. Second strut 152 follows, as a result of coupling to supports 148 and 42 common to first strut 150. Bracket 148 rotates relative to the leg 14 following the articulation of struts 150 and 152, as leg 14 approaches a position parallel with main column 12. Throughout this movement, the wheel 28 is maintained substantially parallel with wheel 30 (FIG. 1), since the wheel mounting segment 160 of bracket 148 is maintained at the selected oblique angle to the planes of pivot of legs 14 and 16.

In order to regulate the power to the independent direct drive motors 32 and 34, is is necessary to provide suitable power control. In FIG. 9, a block diagram of a power network for the golf cart 10 is illustrated. The network comprises the throttle potentiometer 72, d.c. motors 32 and 34, power control circuit 40, and d.c. battery 46.

The power control circuit 40 comprises three elements: a variable pulse width oscillator circuit 170, a first output driver circuit 172 and a second driver output circuit 174. The input of the oscillator circuit 170 is coupled to a variable terminal of the potentiometer 72. Output of the oscillator 170 is coupled to the input of each of the drivers 172 and 174. The output of the drivers 172 and 174 are connected across the respective d.c. motors 32 and 34, which provide an inductive coupling to ground. Diodes D1 and D2 are placed in parallel with the inductive current path of the motors 32 and 34 to provide a circuit for inductive motor current. Power to the circuits 170, 172 and 174 is provided by coupling from the battery 46.

The variable pulse width oscillator 170 may be a conventional design, such as an approximately modified Schmidt trigger with a capacitive charging circuit responsive to the input voltage to thereby provide a variably time delay threshold. The variable pulse width oscillator 170 provides a regulated voltage level output pulse train having a varying pulse width. The duty cycle of the pulse train is proportional to the input voltage. The output pulse train may continuously vary from a duty cycle of 0, i.e. no voltage or current at the output, to a duty cycle of 100%.

Driver circuit 172 and 174 may be conventional transistorized current amplifiers, such as saturated Darlington-configured transistors, wherein the motors 32 and 34 are coupled in the collector circuit of the transistors. The driver circuits 172 and 174 are each capable of providing up to 50 amperes of current at about 10-15 volts d.c. to the motors 32 and 34.

The speed to the d.c. motors 32 and 34 is roughly proportional to the average applied voltage, and the motor torque is proportional to the motor armature current. In the particular application herein described, independent regulation of the motor speed in part by varying the repetitive power pulse to the motors 32 and 34 while varying the mechanical loading has been found to be possible. Reference is made to the wave form diagrams of FIG. 10 for understanding the motor speed regulation scheme.

In operation, a continuously variable voltage is developed in potentiometer 72 which is applied at the input of oscillator 170. Two input voltage levels are illustrated in FIG. 10A. The oscillator 170 provides an output pulse train of a selected voltage level and frequency having a duty cycle proportional to the input voltage level. (A switching frequency of about 70 Hz has been found to be suitable under the contemplated loading conditions of a golf cart.) Two representative output duty cycles are illustrated in FIG. 10B for input voltage levels of FIG. 10A. The phantom lines in FIG. 10B are representative of the average current which is directly proportional to the duty cycle and the input voltage.

The driver circuits 172 each respond to the oscillator 170 output by switching between a full OFF state and a full ON state, applying full battery voltage across the motors 32 and 34. The motors 32 and 34 develop a back emf in response to the induced mechanical rotation. The dynamic characteristic of the current is dependent upon the duty cycle of the applied voltage and upon the speed of the motor, maximum torque being developed where current is maximum and motor speed is minimum. Representative current output characteristics of the switching circuits 172 or 174 are illustrated in FIG. 10C, and a motor torque characteristic is shown in FIG. 10B. Since collapse of the current-induced magnetic field can not be instantaneous, the diodes D1 and D2, provide across the motors 32 and 34, facilitate circulation of the residual current. This prevents abrupt current change which may possibly damage the drivers 172 and 174, and provides an integration of the input current pulse over the complete cycle.

The motors 32 and 34 are driven by the sequence of relatively short repetitive high torque pulses. Inertial loading on the motors operates as a mechanical integrator or low pass filter, so that the peak power pulses are smoothed to an average power level at the wheels.

A number of mechanisms cooperate to enable the speed of the motors 32 and 34 to vary relative to one another such that both motors benefit from direct drive and approximately equal loading on the wheels. The result may be described as a limited slip differential. First, the motors 32 and 34 are electrically isolated from one another at the drivers 172 and 174. This permits each of the motors 32 and 34 to turn at a different speed without affecting the operation of the other. Second, with the motors 32 and 34, are driven by a rapid sequence of short, high torque pulses, mechanically filtered to a relatively low *average* torque, so changes in mechanical loading can be made externally without significantly changing the *average* traction of the wheels or shifting the power distribution as between the drive wheels. Pulse-driven motors which are isolated from one another suffer none of the problems generally associated with parallel or serial coupled drive motors, as found in the prior art. Since both drive motors in the present invention are always driven with the same peak torque, the vehicle has no propriety to wander, to stop upon encountering obstacles or to lose traction on slippery terrain, which are characteristics of series coupled motors.

Moreover, at moderate average torque levels, turning is very easy. The operator may either speed up or slow down the cart to turn the wheels without noticeable interference or "bucking" between the motors, which is a characteristic of parallel coupled motors of the prior art. FIG. 10E illustrates the speed and speed ranges of the cart at the representative input levels. At the maximum average torque output, i.e., where the duty cycles of the motors approach 100%, the cart 10 may resist turning, since the minimum applied torque to the motors 32 and 34 may not approach zero. Thus, in 10E, it will be noted that there is a lower limit on the range or motor speed where the minumum instantaneous current — and therefore torque (FIGS. 10C and 10D) — substantially exceed zero. This is compensated for by providing the cart 10 with motors 32 and 34 having a speed-torque characteristic which provides a maximum speed substantially above the expected turning speed of the cart, as for example a top speed of 3–4 meters per second where the nominal turning speed is about 1 meter per second. In other words, a practical limit is imposed on the maximum duty cycle of the oscillator 170 during turning. It should be noted, however, that even at the higher speeds (in FIG. 10E), the cart wheel can be urged at a speed higher than the nominal speed without detrimental affect.

Pulse power driven motors impose a relatively low drain on the power source, while the high peak torque is being generated. Efficiency of operation, with the resultant improvement in range and power capabilities, is a substantial advantage.

As other advantages and alternative embodiments are suggested to the person skilled in the relevant art, it is not intended that the invention herein described be limited, except as indicated by the following claims, which set forth the various inventive features.

I claim:

1. In a foldable golf club carrying cart including a guide arm and a pair of laterally disposed drive wheels, the improvement comprising:
    a pair of d.c. drive motors each directly coupled to one of said drive wheels;
    a limited slip electric differential including a power control circuit operative to receive a control signal from an electric throttle and to communicate moderated power to both said independent drive motors in a controlled pulse train for providing independent power to said drive wheels, whereby said cart is easily turned without transfer of power between said drive wheels.

2. The improvement according to claim 1, wherein the power control circuit is operative to provide a controlled pulse train having a maximum duty cycle approximately corresponding to a maximum wheel speed which is substantially above the expected turning speed of the said cart.

3. The improvement according to claim 1 wherein said power control circuit comprises:
    a potentiometer throttle providing a variable input voltage;
    a variable pulse width oscillator; and
    a pair of power switches;
    said variable pulse width oscillator being operative to receive a variable voltage from said throttle and operative to communicate a variable duty cycle pulse train proportional to the input voltage level to said power switches, said power switches each being coupled to one of said motors and being operative to provide a power pulse train to said motors representative of the received pulse train;
    said motors being responsive to said power pulse train to provide torque pulses to said drive wheels at a frequency whereat inertial loading on the motors operates as a mechanical integrator for smoothing the power pulses providing an average power to the drive wheels.

4. Apparatus according to claim 3, wherein the average power to the drive wheels is substantially below the peak power to the drive wheels.

5. The improvement of claim 1 wherein each said drive motor includes a drive shaft and each said drive wheel is supported on an axle rotatably mounted to said cart, the improvement further comprising:

a pair of geared drive trains coupling each said drive shaft with each said axle; and means for frictionally coupling each said axle with each said drive wheel for inhibiting transmittal of shock from said drive wheels to said drive trains.

6. Apparatus according to claim 5 wherein said axle-to-wheel coupling comprises a resilient tubular sleeve disposed in press fit between said wheel and said axle.

7. Apparatus according to claim 6 wherein said sleeve comprises a steel band.

* * * * *